United States Patent
Min et al.

(10) Patent No.: US 10,859,793 B2
(45) Date of Patent: Dec. 8, 2020

(54) ACTUATOR FOR A CAMERA MODULE

(71) Applicant: SAMSUNG ELECTRO-MECHANICS CO., LTD., Suwon-si (KR)

(72) Inventors: Sang Hyun Min, Suwon-si (KR); Jae Hyung Lee, Suwon-si (KR); Kwang Mook Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 356 days.

(21) Appl. No.: 16/001,521

(22) Filed: Jun. 6, 2018

(65) Prior Publication Data

US 2019/0162930 A1 May 30, 2019

(30) Foreign Application Priority Data

Nov. 24, 2017 (KR) ........................ 10-2017-0158297

(51) Int. Cl.
*G02B 7/10* (2006.01)
*G02B 27/64* (2006.01)
(Continued)

(52) U.S. Cl.
CPC ........... *G02B 7/102* (2013.01); *G01D 5/2006* (2013.01); *G01D 5/2291* (2013.01); *G02B 7/08* (2013.01);
(Continued)

(58) Field of Classification Search
CPC . G02B 7/34; G02B 7/08; G02B 7/102; G02B 27/646; G01D 5/2291;
(Continued)

(56) References Cited

U.S. PATENT DOCUMENTS

| | | | | |
|---|---|---|---|---|
| 5,698,910 | A | * | 12/1997 | Bryant ............... H02K 41/0352 310/12.04 |
| 8,526,130 | B2 | * | 9/2013 | Sugiyama ............. H02N 2/062 359/823 |

(Continued)

FOREIGN PATENT DOCUMENTS

CN 107015416 A 8/2017
JP 2005-91156 A 4/2005

(Continued)

OTHER PUBLICATIONS

Korean Office Action dated May 30, 2019 in corresponding Korean Patent Application No. 10-2017-0158297 (5 pages in English and 4 pages in Korean).

(Continued)

*Primary Examiner* — Antony M Paul
(74) *Attorney, Agent, or Firm* — NSIP Law

(57) ABSTRACT

An actuator includes an oscillating unit including two or more oscillation circuits each configured to output an oscillation signal including a frequency, which is changed in response to movement of a detection target, a frequency down-converting unit configured to down-convert frequencies of two or more oscillation signals respectively output from the two or more oscillation circuits, and a determining unit configured to calculate a position of the detection target in response to two or more down-converted oscillation signals output from the frequency down-converting unit.

20 Claims, 5 Drawing Sheets

(51) Int. Cl.
  *G01D 5/22* (2006.01)
  *H02K 11/225* (2016.01)
  *H02K 41/035* (2006.01)
  *H02K 11/22* (2016.01)
  *G02B 7/08* (2006.01)
  *G01D 5/20* (2006.01)

(52) U.S. Cl.
  CPC ......... *G02B 27/646* (2013.01); *H02K 11/022* (2013.01); *H02K 11/225* (2016.01); *H02K 41/0356* (2013.01)

(58) Field of Classification Search
  CPC ............. H02K 11/225; H02K 41/0356; H02K 11/022; H04N 5/2254; H04N 5/2252; H04N 5/23212; H04N 5/23267; H02P 1/00; H02P 1/04; H02P 1/46; H02P 3/00; H02P 23/00; H02P 7/00; H02P 8/00; H02P 27/00; H02P 27/04; H02P 27/06; H02P 23/08; H02P 6/00; H02P 25/034; H03L 7/07; H03L 7/099; H03L 7/00; H03L 7/141; H01F 38/04; H03B 19/03; H03B 19/18; H03B 27/00; G01S 13/40
  USPC .......... 318/607, 723, 807, 400.01, 700, 721, 318/801, 671; 363/173; 324/256, 259; 331/2, 34, 41, 48, 51
  See application file for complete search history.

(56) References Cited

U.S. PATENT DOCUMENTS

2005/0168584 A1    8/2005    Uenaka
2017/0223347 A1    8/2017    Ezawa et al.
2017/0264794 A1    9/2017    Park et al.

FOREIGN PATENT DOCUMENTS

| | | |
|---|---|---|
| JP | 2005-283546 A | 10/2005 |
| JP | 4390347 B2 | 12/2009 |
| JP | 2011-179914 A | 9/2011 |
| JP | 5227350 B2 | 7/2013 |
| JP | 2016-099218 A | 5/2016 |
| KR | 10-2013-0077216 A | 7/2013 |
| KR | 10-2017-0105234 A | 9/2017 |

OTHER PUBLICATIONS

Chinese Office Action dated Jun. 1, 2020 in counterpart Chinese Patent Application No. 201811137789.X (8 pages in English and 8 pages in Chinese).

* cited by examiner

ACTUATOR FOR A CAMERA MODULE

CROSS-REFERENCE TO RELATED APPLICATIONS

This application claims the benefit under 35 USC 119(a) of Korean Patent Application No. 10-2017-0158297 filed on Nov. 24, 2017, in the Korean Intellectual Property Office, the entire disclosure of which is incorporated herein by reference for all purposes.

BACKGROUND

1. Field

This application relates to an actuator for a camera module.

2. Description of the Background

Recently, portable communications terminals such as cellular phones, personal digital assistants (PDAs), portable personal computers (PCs), and the like, have generally been implemented with the ability to perform the transmission of video data, in addition to the transmission of text or audio data. In accordance with such a trend, camera modules have recently become standard in the portable communications terminals to enable the transmission of video data, allow for video chatting, and the like.

Generally, a camera module includes a lens barrel having lenses disposed therein, a housing to accommodate the lens barrel therein, and an image sensor to convert an image of a subject into an electrical signal. A single focus type camera module to capture an image of a subject at a fixed focus may be used as the camera module. However, recently, in accordance with the development of technology, a camera module including an actuator enabling autofocusing (AF) has been used. In addition, a camera module may include an actuator for performing optical image stabilization (OIS) in order to suppress a resolution decrease phenomenon due to handshake.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator includes an oscillating unit including two or more oscillation each configured to output an oscillation signal including a frequency, which is changed in response to movement of a detection target, a frequency down-converting unit configured to down-convert frequencies of two or more oscillation signals respectively output from the two or more oscillation circuits, and a determining unit configured to calculate a position of the detection target in response to two or more down-converted oscillation signals output from the frequency down-converting unit.

The frequency down-converting unit may include two or more mixers each configured to down-convert the frequencies of the respective two or more oscillation signals.

The two or more mixers may be further configured to down-convert the frequencies of the two or more oscillation signals using a frequency of a reference signal.

The two or more mixers may be further configured to subtract the reference signal from the two or more oscillation signals, respectively.

The two or more mixers may be further configured to receive two or more reference signals different from each other, respectively, and frequencies of the two or more reference signals may be determined in response to the frequencies of the two or more oscillation signals.

Frequency differences between the two or more reference signals and the two or more oscillation signals, respectively, may be the same as each other.

Each of the two or more oscillation circuits may include a sensing coil disposed to face the detection target.

The determining unit may be configured to detect a displacement of the detection target in a first direction parallel to a surface on which two or more sensing coils are disposed in response to a difference between the two or more down-converted oscillation signals.

The determining unit may be configured to detect a displacement of the detection target in a second direction perpendicular to a surface on which two or more sensing coils are disposed in response to a sum of the two or more down-converted oscillation signals.

A frequency change ratio of the down-converted oscillation signal may be greater than a frequency change ratio of the oscillation signal.

A camera module may include the actuator.

A portable communications terminal may include the camera module.

In another general aspect, an actuator includes an oscillating unit including two or more oscillation circuits respectively configured to output oscillation signals of which frequencies are changed in response to movement of a detection target, a frequency down-converting unit configured to increase frequency change ratios of two or more oscillation signals respectively output from the two or more oscillation circuits, and a determining unit configured to calculate a position of the detection target in response to each of two or more down-converted oscillation signals output from the frequency down-converting unit.

The frequency down-converting unit may be configured to down-convert frequencies of the two or more oscillation signals to generate the two or more down-converted oscillation signals including a frequency change ratio greater than a frequency change ratio of the two or more oscillation signals.

The frequency down-converting unit may include two or more mixers configured to respectively down-convert the frequencies of the two or more oscillation signals, using a reference signal.

In another general aspect, an actuator includes an oscillating unit including a first oscillation circuit configured to output a first oscillation signal having a first frequency that changes in response to a movement of a detection target, and a second oscillation circuit configured to output a second oscillation signal having a second frequency that changes in response to the movement of the detection target, a frequency down-converting unit configured to down-convert the first and second frequencies, and a determining unit configured to calculate a position of the detection target in response to the down-converted first and second frequencies.

The oscillating unit may include more than one second oscillation circuit.

Other features and aspects will be apparent from the following detailed description, the drawings, and the claims.

Figure 1:
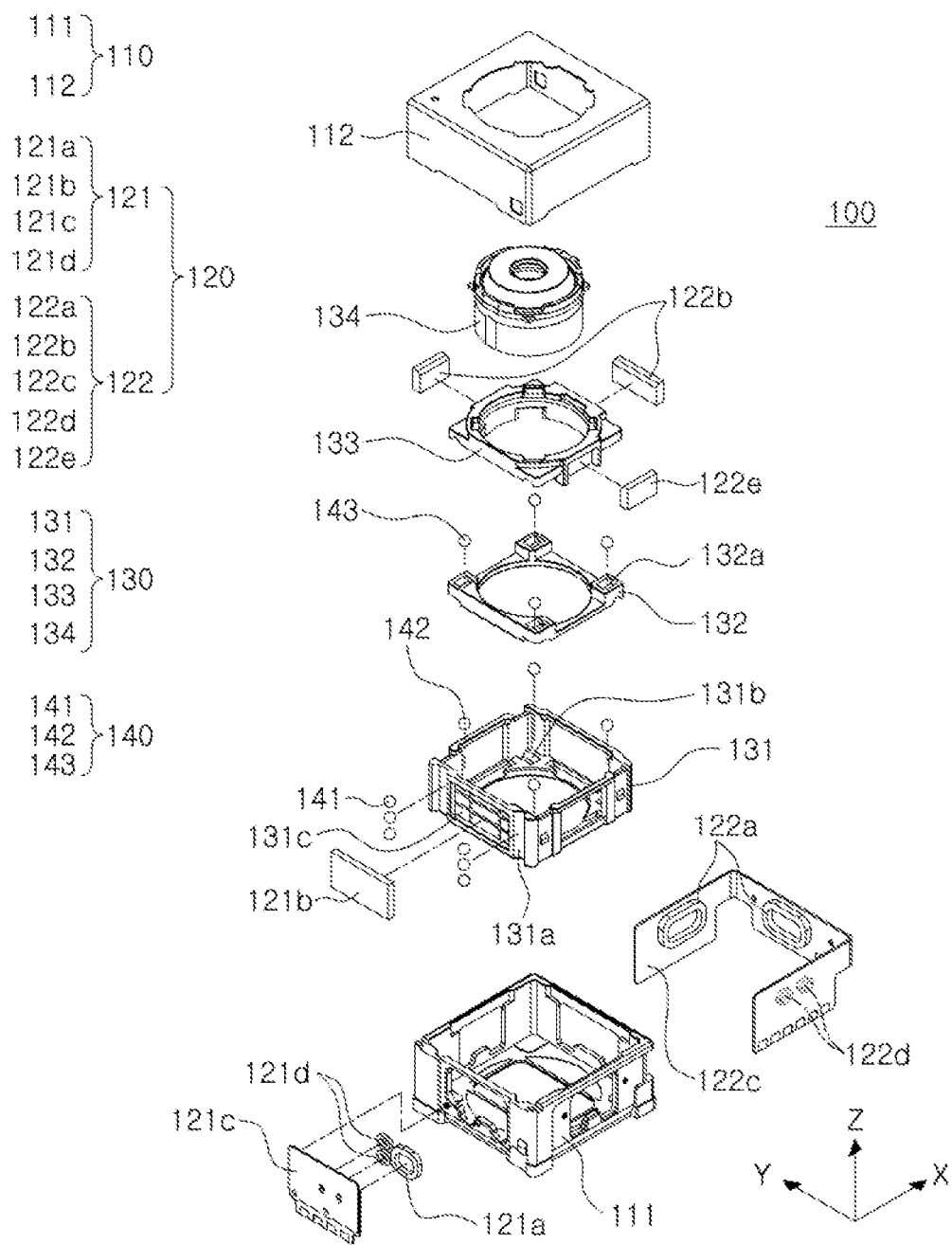
FIG. 1 is an exploded perspective view illustrating an example of a camera module.

Throughout the drawings and the detailed description, the same reference numerals refer to the same elements. The drawings may not be to scale, and the relative size, proportions, and depiction of elements in the drawings may be exaggerated for clarity, illustration, and convenience. In the drawings, for example, due to manufacturing techniques and/or tolerances, modifications of the shape shown may be estimated. Thus, the examples described herein should not be construed as being limited to the particular shapes of regions shown herein, for example, the examples described herein include a change in shape as a result of manufacturing.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness. The following examples may also be constituted by one or a combination thereof.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be construed as being limited by these terms. These terms are only used to distinguish one member, component, region, layer or section from another region, layer or section. Thus, a first member, component, region, layer or section discussed below could be termed a second member, component, region, layer or section without departing from the teachings of the examples described herein.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both upward and downward orientations, depending on a particular direction of the figures. The device may be otherwise oriented (rotated 90 degrees or at other orientations) and the spatially relative descriptors used herein may be interpreted accordingly.

The terminology used herein describes particular examples only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

An aspect of the present disclosure provides an actuator, such as an actuator of a camera module capable of precisely detecting a position of a magnet without using a hall sensor. The actuator may be disposed in a camera module, the camera module may be disposed in a device such as a camera, portable communications terminal, and the like.

FIG. 1 is an exploded perspective view illustrating an example of a camera module.

Referring to FIG. 1, a camera module 100 according to an example includes a housing unit 110, an actuator 120, a lens module 130, and a ball bearing portion 140.

The camera module 100 performs one or more of an autofocusing function and an optical image stabilization function. As an example, in order for the camera module 100 to perform the autofocusing function and the optical image stabilization function, the lens module 130 moves in an optical axis direction (Z-axis direction) and directions (X-axis and Y-axis directions) perpendicular to the optical axis in the housing unit 110.

The housing unit 110 includes a housing 111 and a shield case 112. The housing 111 may be formed of a material that is easily molded. For example, the housing 111 may be formed of plastic. One or more actuator 120 is mounted in the housing 111. As an example, a portion of components of a first actuator 121 is mounted on a first side surface of the housing 111, and a portion of components of a second actuator 122 is mounted on second, third, and fourth side surfaces of the housing 111. The housing 111 is configured to accommodate the lens module 130 therein. As an example, a space in which the lens module 130 is completely or partially accommodated is formed in the housing 111.

Six surfaces of the housing 111 may be open. As an example, a hole for an image sensor is formed in a bottom surface of the housing 111, and a quadrangular hole, in which the lens module 130 is mounted, is formed in a top surface of the housing 111. The first side surface of the housing 111 is open in such a manner that a first driving coil 121a of the first actuator 121 may be inserted thereinto, and the second and third side surfaces of the housing 111 are open in such a manner that second diving coils 122a of the second actuator 122 may be inserted thereinto. In addition, the fourth side surface of the housing 111 is open in such a manner that sensing coils 122d of the second actuator 122 may be inserted thereinto.

The shield case 112 is configured to cover portions of the housing 111. As an example, the shield case 112 is configured to cover the top surface and four side surfaces of the housing 111. Alternatively, the shield case 112 may be configured to cover only the four side surfaces of the housing 111 or may be configured to partially cover the top surface and the four side surfaces of the housing 111. The shield case 112 may block electromagnetic waves generated during driving of the camera module. The electromagnetic waves are generated at the time of driving the camera module, and when the electromagnetic waves are emitted externally of the camera module, the electromagnetic waves may affect other electronic components to cause communications errors or malfunction. In order to prevent such a problem, the shield case 112 may be formed of a metal and be grounded to a ground pad of a substrate mounted on the bottom surface of the housing 111 to block the electromagnetic waves. On the other hand, for example, when the shield case 112 is formed of a plastic injection-molded product, a conductive paint may be applied to an inner surface of the shield case 112, or a conductive film or a conductive tape may be attached to the inner surface of the shield case 112 to block the electromagnetic waves. In this case, the conductive paint may be conductive epoxy, but is not limited thereto. For example, various materials having conductivity may be used as the conductive paint.

The number of actuators 120 may be plural. As an example, the actuators 120 include the first actuator 121 configured to move the lens module 130 in the Z-axis direction and the second actuator 122 configured to move the lens module 130 in the X-axis direction and the Y-axis direction.

The first actuator 121 may be mounted on the housing 111 and a first frame 131 of the lens module 130. As an example, a portion of the components of the first actuator 121 are mounted on the first side surface of the housing 111, and others of the components of the first actuator 121 are mounted on a first side surface of the first frame 131. The first actuator 121 may move the lens module 130 in the Z-axis direction. As an example, the first actuator 121 includes the first driving coil 121a, a first magnet 121b, a first substrate 121c, and one or more autofocusing (AF) sensing coil 121d. The first driving coil 121a and the AF sensing coil 121d are formed on the first substrate 121c. The first substrate 121c is mounted on the first side surface of the housing 111, and the first magnet 121b is mounted on the first side surface 131c of the first frame 131 facing the first substrate 121c.

A first driving device (not illustrated) to provide a driving signal to the first driving coil 121a is provided on the first substrate 121c. The first driving device applies the driving signal to the first driving coil 121a to provide driving force to the first magnet 121b. The first driving device includes a driver integrated circuit (IC) providing the driving signal to the first driving coil 121a. For example, when the driving signal is applied to the first driving coil 121a from the first driving device, a magnetic flux is generated by the first driving coil 121a, and interacts with a magnetic field of the first magnet 121b to generate driving force enabling relative movement of the first frame 131 and a lens barrel 134 with respect to the housing 111 depending on Fleming's left-hand rule. The first driving device may include an H-bridge circuit that may be bi-directionally driven, to apply the driving signal to the first driving coil 121a.

The lens barrel 134 moves in the same direction as a moving direction of the first frame 131 by movement of the first frame 131. The first actuator 121 senses strength of the magnetic field of the first magnet 121b by the AF sensing coil 121d to detect positions of the first frame 131 and the lens barrel 134.

The AF sensing coil 121d is disposed outside of the first driving coil 121a, and is comprised of one or more coil. An inductance of the AF sensing coil 121d is changed in response to a displacement of the first magnet 121b. For example, when the first magnet 121b moves in one direction, the strength of the magnetic field of the first magnet 121b having an influence on the AF sensing coil 121d is changed, and the inductance of the AF sensing coil 121d may thus be changed. The first actuator 121 determines displacements of the lens barrel 134 and the first frame 131 from the change in the inductance of one or more AF sensing coil 121d. As an example, the first actuator 121 further includes one or more capacitor, and the one or more capacitor and the AF sensing coil 121d form a predetermined oscillation circuit. As an example, the number of capacitors included in the first actuator 121 corresponds to that of AF sensing coils 121d, and one capacitor and one AF sensing coil 121d are configured in a form such as a predetermined LC oscillator or be configured in a form such as Colpitts oscillator well known in the art.

The first actuator 121 determines the displacement of the lens barrel 134 from a change in a frequency of an oscillation signal generated by the oscillation circuit. For example, when the inductance of the AF sensing coil 121d forming the oscillation circuit is changed, the frequency of the oscillation signal generated by the oscillation circuit is changed, and the displacement of the lens barrel 134 is thus detected on the basis of the change in the frequency.

The second actuator 122 is be mounted on the housing 111 and a third frame 133 of the lens module 130. As an example, a portion of the components of the second actuator 122 are mounted on the second, third, and fourth side surfaces of the housing 111, and others of the components of the second actuator 122 are mounted on second, third, and fourth side surfaces of the third frame 133. According to another example, the second actuator 122 may be mounted on a portion of the second, third, and fourth side surfaces of the third frame 133 and the housing 111, on corners at which the second, third, and fourth side surfaces of the housing 111 are in contact with each other, and/or on corners at which the second, third, and fourth side surfaces of the third frame 133 are in contact with each other.

The second actuator 122 moves the lens module 130 in the X-axis direction and the Y-axis direction. As an example, the second actuator 122 includes second driving coils 122a, second magnets 122b, a second substrate 122c, optical image stabilization (OIS) sensing coils 122d, and a detection target 122e.

The second driving coils 122a and the OIS sensing coils 122d are formed on the second substrate 122c. In an example, as the second driving coils 122a, two second driving coils are used. The two second driving coils 122a are disposed on second and third side surfaces of the second substrate 122c, respectively. In addition, as the OIS sensing coils 122d, two OIS sensing coils are used. The two OIS sensing coils 122d are disposed on a fourth side surface of the second substrate 122c. The two OIS sensing coils 122d detect movement of the lens barrel 134 in the X-axis and Y-axis directions.

The second substrate 122c has a generally quadrangular shape of which one or more side is open, and is mounted to surround the second, third, and fourth side surfaces of the housing 111. The second magnets 122b are mounted on the second and third side surfaces of the third frame 133, respectively, to face the second driving coils 122a disposed on the second substrate 122c, and the detection target 122e is mounted on the fourth side surface of the third frame 133 to face the OIS sensing coils 122d disposed on the second substrate 122c.

A second driving device (not illustrated) to provide driving signals to the second driving coils 122a is provided on the second substrate 122c. The second driving device applies the driving signals to the second driving coils 122a to provide driving force to the second magnets 122b. The second driving device may include a driver IC providing the driving signals to the second driving coils 122a. For example, when the driving signals are provided from the second driving device to the second driving coils 122a, magnetic fluxes are generated by the second driving coils 122a, and interact with magnetic fields of the second magnets 122b. The second driving device changes a magnitude and a direction of magnetic force generated between the second driving coils 122a and the second magnets 122b, to enable relative movement of a second frame 132 or the third frame 133 with respect to the first frame 131. The second driving device may include an H-bridge circuit that may be bi-directionally driven to apply the driving signals to the second driving coils 122a.

The lens barrel 134 moves in the same direction as a moving direction of the second frame 132 or the third frame 133 by the movement of the second frame 132 or the third frame 133. The second actuator 122 senses strength of a magnetic field of the detection target 122e, by the OIS sensing coils 122d, to detect a position of the lens barrel moving in the same direction as a moving direction of the second frame 132 and the third frame 133. As an example, the detection target 122e may be formed of one of a magnetic body, a conductor, or a yoke.

The second actuator 122 senses the strength of the magnetic field of the detection target 122e, from changes in inductances of the OIS sensing coils 122d, to detect the position of the second frame 132 or the third frame 133.

The lens module 130 is mounted in the housing unit 110. As an example, the lens module 130 is accommodated in an accommodation space formed by the housing 111 and the shield case 112, to be movable in at least three axis directions. The lens module 130 includes a plurality of frames. As an example, the lens module 130 may include the first frame 131, the second frame 132, and the third frame 133.

The first frame 131 is configured to be movable with respect to the housing 111. As an example, the first frame 131 moves in the Z-axis direction of the housing 111 by the first actuator 121 described above. Guide grooves 131a and 131b may be formed in the first frame 131. As an example, a first guide groove 131a extended lengthwise in the Z-axis direction is formed in the first side surface of the first frame 131, and second guide grooves 131b extended lengthwise in the Y-axis direction are formed in four corners of an inner bottom surface of the first frame 131, respectively. The first frame 131 may be manufactured to have a form in which at least three side surfaces thereof are open. As an example, second and third side surfaces of the first frame 131 are open, such that the second magnets 122b mounted on the third frame 133 and the second driving coils 122a mounted on the second substrate 122c disposed on the housing 111 face each other, and a fourth side surface of the first frame 131 is open, such that the detection target 122e, mounted on the third frame 133, and the OIS sensing coils 122d mounted on the second substrate 122c disposed on the housing 111 face each other.

The second frame 132 is mounted in the first frame 131. As an example, the second frame 132 is mounted in an internal space of the first frame 131. The second frame 132 is configured to move in the Y-axis direction with respect to the first frame 131. As an example, the second frame 132 moves in the Y-axis direction along the second guide grooves 131b of the first frame 131.

Guide grooves 132a are formed in the second frame 132. As an example, four third guide grooves 132a extended lengthwise in the X-axis direction are formed in corners of the second frame 132, respectively. The third frame 133 is mounted on the second frame 132. The third frame 133 is mounted on an upper surface of the second frame 132. The third frame 133 is configured to move in the X-axis direction with respect to the second frame 132. As an example, the third frame 133 moves in the X-axis direction along the third guide grooves 132a of the second frame 132. The second magnets 122b and the detection target 122e are mounted on the third frame 133. As an example, two second magnets 122b are mounted on the second and third side surfaces of the third frame 133, respectively, and the detection target 122e is mounted on the fourth side surface of the third frame 133. On the other hand, in another example, the third frame 133 described above may be formed integrally with the second frame 132. In this case, the third frame 133 is omitted, and the second frame 132 moves in the X-axis direction and the Y-axis direction.

The lens module 130 includes the lens barrel 134. As an example, the lens module 130 includes the lens barrel 134 including one or more lenses. The lens barrel 134 has a hollow cylindrical shape, in which one or more lens capturing an image of a subject is accommodated, and the lens is provided in the lens barrel 134 along the optical axis. The number of lenses stacked in the lens barrel 134 depends on a set design of the lens barrel 134, and the lenses may have optical characteristics such as the same refractive index, different refractive indices, refractive power, or the like.

The lens barrel 134 is mounted in the third frame 133. As an example, the lens barrel 134 is fitted into the third frame 133 to thus move integrally with the third frame 133. The lens barrel 134 is configured to move in the Z-axis direction, the X-axis direction, and the Y-axis direction. As an example, the lens barrel 134 moves in the Z-axis direction by the first actuator 121, and moves in the X-axis and Y-axis directions by the second actuator 122.

The ball bearing portion 140 guides the movement of the lens module 130. As an example, the ball bearing portion 140 is configured in such a manner that the lens module 130 smoothly moves in the optical axis direction and the directions perpendicular to the optical axis. The ball bearing portion 140 includes first ball bearings 141, second ball bearings 142, and third ball bearings 143. As an example, the first ball bearings 141 are disposed in the first guide groove 131a of the first frame 131 to allow the first frame 131 to move smoothly in the optical axis direction. As another example, the second ball bearings 142 are disposed in the second guide grooves 131b of the first frame 131 to allow the second frame 132 to move smoothly in the first direction perpendicular to the optical axis. As another example, the third ball bearings 143 are disposed in the third guide grooves 132a of the second frame 132 to allow the third frame 133 to move smoothly in the second direction perpendicular to the optical axis.

Each of the first and second ball bearings 141 and 142 may include at least three balls, and the at least three balls of each of the first and second ball bearings 141 and 142 may be disposed in the first or second guide grooves 131a or 131b, respectively.

A lubricating material for reducing friction and noise may be filled in all the portions in which the ball bearing portion 140 is disposed. As an example, a viscous fluid may be injected into the respective guide grooves 131a, 131b, and 132a. As the viscous fluid, grease having excellent viscosity and lubricating characteristics may be used.

Figure 2:
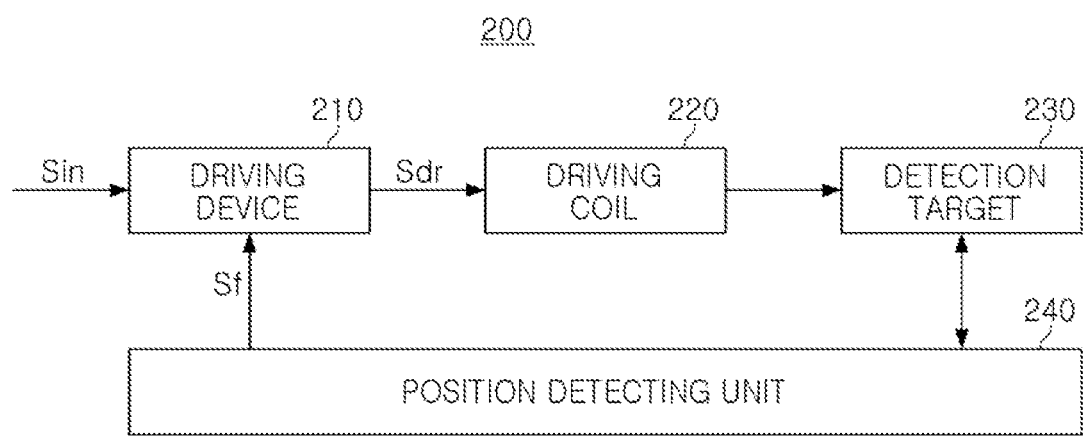
FIG. 2 is a block diagram illustrating an example of main units of an actuator used in the camera module of FIG. 1.

FIG. 2 is a block diagram illustrating an example of main units of an actuator used in the camera module. An actuator 200 according to an example of FIG. 2 may correspond to the second actuator 122 of FIG. 1.

In the case that the actuator 200 of FIG. 2 corresponds to the second actuator 122 of FIG. 1, the actuator 200 moves the lens barrel in the directions perpendicular to the optical axis, to perform an OIS function of the camera module. Therefore, for example, when the actuator 200 of FIG. 2 performs the optical image stabilization function, a driving device 210 applies a driving signal Sdr to a driving coil 220 to provide driving force in the directions perpendicular to the optical axis to a magnet.

The actuator 200 in the examples disclosed herein includes the driving device 210, the driving coil 220, a detection target 230, and a position detecting unit 240.

The driving device 210 generates the driving signal Sdr in response to an input signal Sin applied by an external source and a feedback signal Sf generated by the position detecting unit 240, and provides the generated driving signal Sdr to the driving coil 220. For example, when the driving signal Sdr is applied to the driving coil 220 from the driving device 210, the lens barrel moves in the directions perpendicular to the optical axis by electromagnetic interaction between the driving coil 220 and the magnet.

The position detecting unit 240 calculates a position of the lens barrel moving by the electromagnetic interaction between the magnet and the driving coil 220, through the detection target 230, to generate the feedback signal Sf, and provide the feedback signal Sf to the driving device 210. The detection target 230 is provided on a side of the lens barrel, to move in the same direction as a moving direction of the lens barrel, and may face sensing coils of the position detecting unit 240. As an example, the detection target 230 corresponds to the detection target 122e of FIG. 1.

The position detecting unit 240 includes sensing coils, and calculates a position of the lens barrel in response to inductances of the sensing coils. For example, when the detection target 230 provided on the side of the lens barrel moves, distances and overlapping areas between the sensing coils and the detection target are changed, and the position detecting unit 240 thus calculates positions of the lens barrel in the X-axis and Y-axis directions, in response to inductances of the sensing coils changed in response to the movement of the detection target 230. In this example, the sensing coils included in the position detecting unit 240 correspond to the OIS sensing coils 122d included in the second actuator 122 of FIG. 1.

Figure 3:
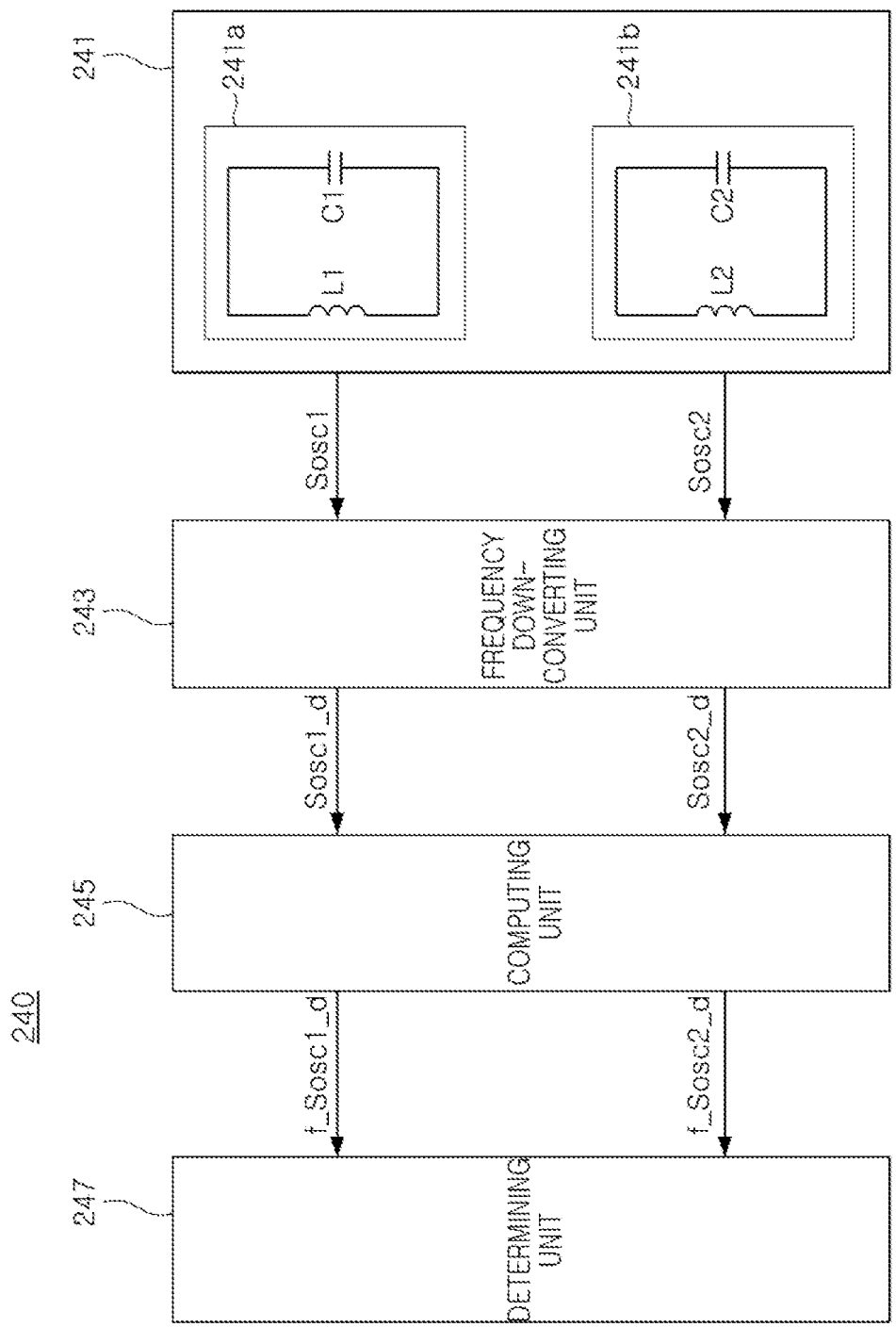
FIG. 3 is a block diagram illustrating an example of a position detecting unit.

FIG. 3 is a block diagram illustrating an example of a position detecting unit. An operation of calculating the position of the lens barrel by the position detecting unit 240 will hereinafter be described with reference to FIGS. 1 through 3.

The position detecting unit 240 in the examples disclosed herein include an oscillating unit 241, a frequency down-converting unit 243, a computing unit 245, and a determining unit 247.

The oscillating unit 241 includes two or more oscillation circuits to generate oscillation signals Sosc. The oscillating unit 241 includes a first oscillation circuit 241a and a second oscillation circuit 241b. The first oscillation circuit 241a and the second oscillation circuit 241b are disposed to face the detection target 230.

Each of the first oscillation circuit 241a and the second oscillation circuit 241b include a sensing coil and a capacitor, to constitute a predetermined LC oscillator. For example, the first oscillation circuit 241a includes a first sensing coil L1 and a first capacitor C1, and the second oscillation circuit 241b includes a second sensing coil L2 and a second capacitor C2.

In this example, the first sensing coil L1 and the second sensing coil L2 included in the first oscillation circuit 241a and the second oscillation circuit 241b, respectively, correspond to the OIS sensing coils 122d included in the second actuator 122 of FIG. 1. For example, referring to FIG. 1, the first sensing coil L1 and the second sensing coil L2 correspond to the two OIS sensing coils 122d, disposed on the fourth side surface of the second substrate 122c of FIG. 1 to face the detection target 122e. The first sensing coil L1 and the second sensing coil L2 are disposed in one direction, for example, the X-axis direction of FIG. 1, to face the surface of the lens barrel.

The first oscillation circuit 241a and the second oscillation circuit 241b of FIG. 3, schematically illustrated in the drawings, may be configured in forms of various types of oscillators known in the art.

Frequencies of oscillation signals Sosc1 and Sosc2 of the first oscillation circuit 241a and the second oscillation circuit 241b are determined by inductances of the first sensing coil L1 and the second sensing coil L2. For example, when the oscillation circuit is implemented by the LC oscillator including a sensing coil and a capacitor, the frequency f of the oscillation signal Sosc is represented by Equation 1. In Equation 1, "l" indicates inductances of the first sensing coil L1 and the second sensing coil L2, and "c" indicates capacitances of the first capacitor C1 and the second capacitor C2.

$$f = \frac{1}{2\pi\sqrt{lc}}$$

Equation 1

For example, when the lens barrel moves, strength of a magnetic field of the detection target 230 having an influence on the inductances of the first sensing coil L1 and the second sensing coil L2 of the oscillation unit 241 is changed, and the inductances of the first sensing coil L1 and the second sensing coil L2 are thus changed. Therefore, frequencies of a first oscillation signal Sosc1 and a second oscillation signal Sosc2 output from the first oscillation circuit 241a and the second oscillation circuit 241b, respectively, are changed in response to the movement of the detection target 230. In the examples disclosed herein, a magnetic material having relatively high magnetic permeability may be disposed between the detection target 230 and the oscillating unit 241, to increase change ratios in the inductances of the first sensing coil L1 and the second sensing coil L2, based on the movement of the detection target 230.

The frequency down-converting unit 243 down-converts frequencies of the first oscillation signal Sosc1 and the second oscillation signal Sosc2 output, respectively, from the first oscillation circuit 241a and the second oscillation circuit 241b. The frequency down-converting unit 243 down-converts the frequencies of the first oscillation signal Sosc1 and the second oscillation signal Sosc2 and outputs a first down-converted oscillation signal Sosc1_d and a second down-converted oscillation signal Sosc2_d.

Figure 4:
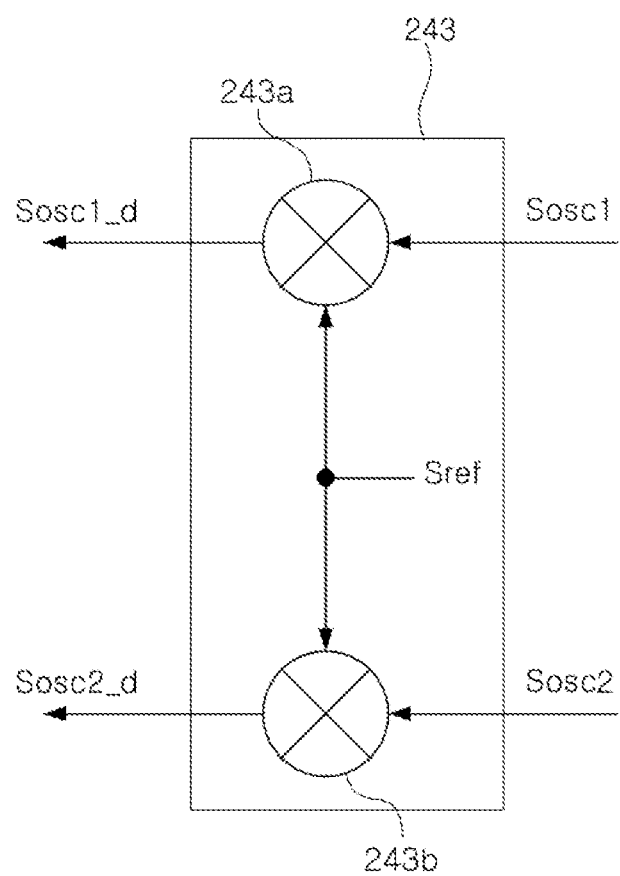
FIG. 4 is a block diagram illustrating an example of a frequency down-converting unit.

FIG. 4 is a block diagram illustrating an example of a frequency down-converting unit.

The frequency down-converting unit 243 includes two or more mixers to which a reference signal Sref is provided, and the two or more mixers include a first mixer 243a and a second mixer 243b. The first mixer 243a and the second mixer 243b receive the first oscillation signal Sosc1 and the second oscillation signal Sosc2 output from the first oscillation circuit 241a and the second oscillation circuit 241b, respectively.

The first mixer 243a down-converts the frequency of the first oscillation signal Sosc1 using a frequency of the reference signal Sref, and the second mixer 243b down-converts the frequency of the second oscillation signal Sosc2 using the frequency of the reference signal Sref. As an example, the first mixer 243a subtracts the reference signal Sref from the first oscillation signal Sosc1 to output the first down-converted oscillation signal Sosc1_d, and the second mixer 243b subtracts the reference signal Sref from the second oscillation signal Sosc2 to output the second down-converted oscillation signal Sosc2_d.

Although a case in which one reference signal Sref is provided to the first mixer 243a and the second mixer 243b is illustrated in FIG. 4, in another example, different reference signals Sref may also be provided to the first mixer 243a and the second mixer 243b, respectively. For example, frequencies of the different reference signals Sref are determined in response to the frequencies of the first oscillation signal Sosc1 and the second oscillation signal Sosc2.

For example, when the frequencies of the first oscillation signal Sosc1 and the second oscillation signal Sosc2 are the same as each other, the same reference signal Sref is provided to the first mixer 243a and the second mixer 243b, to secure the same sensing sensitivity. However, for example, in a case in which frequencies of the first oscillation signal Sosc1 and the second oscillation signal Sosc2 are different from each other, if the same reference signal Sref is provided to the first mixer 243a and the second mixer 243b, a problem in which sensing sensitivities are different from each other may occur.

Therefore, in the examples disclosed herein, the different reference signals Sref determined in response to the frequencies of the first oscillation signal Sosc1 and the second oscillation signal Sosc2 are provided to the first mixer 243a and the second mixer 243b, respectively, to secure the same sensing sensitivity. As an example, a difference between a first reference signal down-converting the frequency of the first oscillation signal Sosc1 and the first oscillation signal Sosc1 are the same as that between a second reference signal down-converting the frequency of the second oscillation signal Sosc2 and the second oscillation signal Sosc2.

Again, referring to FIG. 3, the computing unit 245 computes a frequency f_Sosc1_d of the first down-converted oscillation signal Sosc1_d and a frequency f_Sosc2_d of the second down-converted oscillation signal Sosc2_d. As an example, the computing unit 245 computes the frequency f_Sosc1_d of the first down-converted oscillation signal Sosc1_d and the frequency f_Sosc2_d of the second down-converted oscillation signal Sosc2_d, using reference clocks CLK. For example, the computing unit 245 counts the oscillation signals using the reference clocks CLK, and computes the frequencies using the number of counted reference clocks CLK and frequencies of the reference clocks CLK. As an example, the computing unit 245 counts oscillation signals during a reference section as the reference clocks CLK.

The determining unit 247 determines positions of the lens barrel in the X-axis and Y-axis directions, in response to the frequency f_Sosc1_d of the first down-converted oscillation signal Sosc1_d and the frequency f_Sosc2_d of the second down-converted oscillation signal Sosc2_d transferred from the computing unit 245.

The determining unit 247 determines a position P_x of the lens barrel in the X-axis direction in response to a difference between the frequency f_Sosc1_d of the first down-converted oscillation signal Sosc1_d and the frequency f_Sosc2_d of the second down-converted oscillation signal Sosc2_d as represented by the following Equation 2.

$$P\_x = f\_Sosc1\_d - f\_Sosc2\_d \qquad \text{Equation 2}$$

In FIG. 1, for example, when the lens barrel moves along an X axis, directions of a change in the inductance of the first sensing coil L1 and a change in the inductance of the second sensing coil L2 are different from each other. When the lens barrel moves in one direction of the X axis, in a case in which the inductance of the first sensing coil L1 is increased, the inductance of the second sensing coil L2 is decreased. Therefore, the position of the lens barrel in the X-axis direction is calculated from the difference between the frequency f_Sosc1_d of the first down-converted oscillation signal Sosc1_d and the frequency f_Sosc2_d of the second down-converted oscillation signal Sosc2_d.

The determining unit 247 determines a position P_y of the lens barrel in the Y-axis direction in response to the sum of the frequency f_Sosc1_d of the first down-converted oscillation signal Sosc1_d and the frequency f_Sosc2_d of the second down-converted oscillation signal Sosc2_d as represented by the following Equation 3.

$$P\_y = f\_Sosc1\_d + f\_Sosc2\_d \qquad \text{Equation 3}$$

In FIG. 1, for example, when the lens barrel moves along a Y axis, directions of changes in the inductances of the first sensing coil L1 and the second sensing coil L2 are the same as each other. When the lens barrel moves in one direction of the Y axis, the inductances of the first sensing coil L1 and the second sensing coil L2 are increased, and when the lens barrel moves in a direction opposite from the one direction of the Y axis, the inductances of the first sensing coil L1 and the second sensing coil L2 are decreased.

Therefore, the position of the lens barrel in the Y-axis direction is calculated from the sum of the frequency f_Sosc1_d of the first down-converted oscillation signal Sosc1_d and the frequency f_Sosc2_d of the second down-converted oscillation signal Sosc2_d.

The determining unit 247 includes a memory, and information regarding a position of the lens barrel, corresponding to computing results of frequency change ratios, is stored in the memory. The memory may be implemented by a non-volatile memory including one of a flash memory, an electrically erasable programmable read-only memory (EEPROM), and a ferroelectric random-access memory (FeRAM). The determining unit 247 determines the position of the lens barrel by comparing a computing result, based on Equations 2 and 3, with the position information of the lens barrel stored in the memory.

Figure 5A:
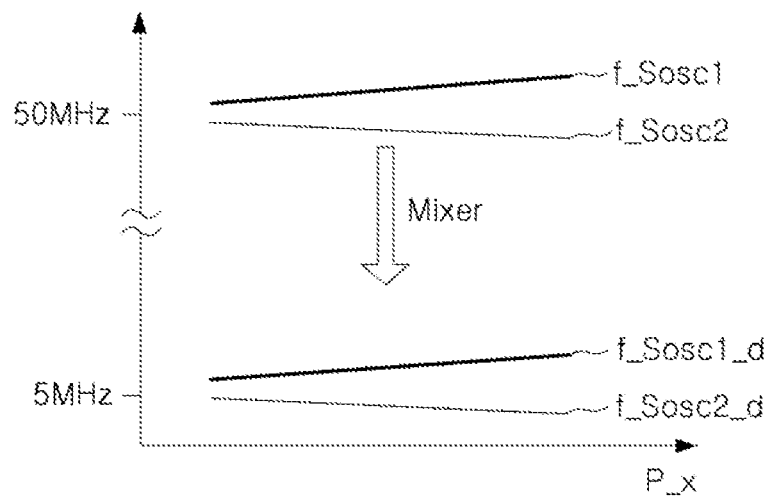
FIGS. 5A and 5B are graphs illustrating simulation results of example frequencies and positions.
Figure 5B:
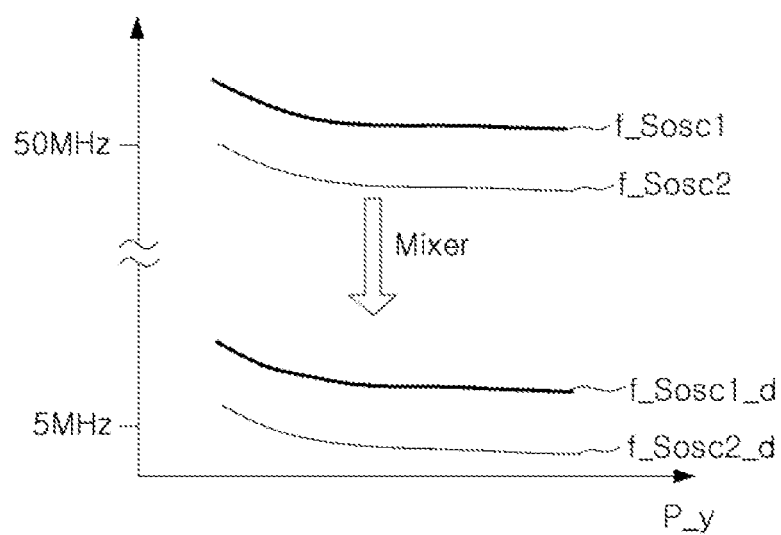

FIGS. 5A and 5B are graphs illustrating simulation results of example frequencies and positions.

FIGS. 5A and 5B illustrate the frequencies f_Sosc1 of the first oscillation signal Sosc1, the frequencies f_Sosc2 of the second oscillation signal Sosc2, the frequencies f_Sosc1_d of the first down-converted oscillation signal Sosc1_d, and the frequencies f_Sosc2_d of the second down-converted oscillation signal Sosc2_d, with respect to the position P_x of the lens barrel in the X-axis direction and the position P_y of the lens barrel in the Y-axis direction, respectively.

Frequency change ratios of the frequency f_Sosc1_d of the first down-converted oscillation signal Sosc1_d and the frequency f_Sosc2_d of the second down-converted oscillation signal Sosc2_d will be described. A first frequency change ratio V1 of the frequency f_Sosc1_d of the first down-converted oscillation signal Sosc1_d and a second frequency change ratio V2 of the frequency f_Sosc2_d of the second down-converted oscillation signal Sosc2_d are represented by Equations 4 and 5, respectively. In Equation 4, f_Sosc1_d_max indicates a maximum value of the frequency f_Sosc1_d of the first down-converted oscillation signal Sosc1_d, and f_Sosc1_d_min indicates a minimum value of the frequency f_Sosc1_d of the first down-converted oscillation signal Sosc1_d. In addition, f_Sosc1_d_ref indicates a reference value of the frequency f_Sosc1_d of the first down-converted oscillation signal Sosc1_d. As an example, the reference value of the frequency of the first down-converted oscillation signal is one of the maximum value and the minimum value of the frequency of the first down-converted oscillation signal. Likewise, in Equation 5, f_Sosc2_d_max indicates a maximum value of the frequency f_Sosc2_d of the second down-converted oscillation signal Sosc2_d, and f_Sosc2_d_min indicates a minimum value of the frequency f_Sosc2_d of the second down-converted oscillation signal Sosc2_d. In addition, f_Sosc2_d_ref indicates a reference value of the frequency f_Sosc2_d of the second down-converted oscillation signal Sosc2_d. As an example, the reference value of the frequency of the second down-converted oscillation signal is one of the maximum value and the minimum value of the frequency of the second down-converted oscillation signal.

$$V1 = \frac{(f\_Sosc1\_d\_max - f\_Sosc1\_d\_min)}{f\_Sosc1\_d\_ref} = \frac{\Delta f\_Sosc1\_d}{f\_Sosc1\_d\_ref} \quad \text{Equation 4}$$

$$V2 = \frac{(f\_Sosc2\_d\_max - f\_Sosc2\_d\_min)}{f\_Sosc2\_d\_ref} = \frac{\Delta f\_Sosc2\_d}{f\_Sosc2\_d\_ref} \quad \text{Equation 5}$$

In addition, frequency change ratios of the frequency f_Sosc1 of the first oscillation signal Sosc1 and the frequency f_Sosc2 of the second oscillation signal Sosc2 will be described. A first frequency change ratio V1' of the frequency f_Sosc1 of the first oscillation signal Sosc1 and a second frequency change ratio V2' of the frequency f_Sosc2 of the second oscillation signal Sosc2 are represented by Equations 6 and 7, respectively. In Equation 6, f_Sosc1_max indicates a maximum value of the frequency f_Sosc1 of the first oscillation signal Sosc1, and f_Sosc1_min indicates a minimum value of the frequency f_Sosc1 of the first oscillation signal Sosc1. In addition, f_Sosc1_ref indicates a reference value of the frequency f_Sosc1 of the first oscillation signal Sosc1. As an example, the reference value of the frequency of the first oscillation signal is one of the maximum value and the minimum value of the frequency of the first oscillation signal. Likewise, in Equation 7, f_Sosc2_max indicates a maximum value of the frequency f_Sosc2 of the second oscillation signal Sosc2, and f_Sosc2_min indicates a minimum value of the frequency f_Sosc2 of the second oscillation signal Sosc2. In addition, f_Sosc2_ref indicates a reference value of the frequency f_Sosc2 of the second oscillation signal Sosc2. As an example, the reference value of the frequency of the second oscillation signal is one of the maximum value and the minimum value of the frequency of the second oscillation signal.

$$V1' = \frac{(f\_Sosc1\_max - f\_Sosc1\_min)}{f\_Sosc1\_ref} = \frac{\Delta f\_Sosc1}{f\_Sosc1\_ref} \quad \text{Equation 6}$$

$$V2' = \frac{(f\_Sosc2\_max - f\_Sosc2\_min)}{f\_Sosc2\_ref} = \frac{\Delta f\_Sosc2}{f\_Sosc2\_ref} \quad \text{Equation 7}$$

Referring to Equations 4 and 6, it can be seen that a frequency change amount $\Delta f\_Sosc1\_d$ of the first down-converted oscillation signal and a frequency change amount $\Delta f\_Sosc1$ of the first oscillation signal are the same as each other, but the frequency reference value f_Sosc1_d_ref of the first down-converted oscillation signal is smaller than the frequency reference value f_Sosc1_ref of the first oscillation signal, and the frequency change ratio of the first down-converted oscillation signal is thus greater than that of the first oscillation signal.

In addition, referring to Equations 5 and 7, it can be seen that a frequency change amount $\Delta f\_Sosc2\_d$ of the second down-converted oscillation signal and a frequency change amount $\Delta f\_Sosc2$ of the second oscillation signal are the same as each other, but the frequency reference value f_Sosc2_d_ref of the second down-converted oscillation signal is smaller than the frequency reference value f_Sosc2_ref of the second oscillation signal, and the frequency change ratio of the second down-converted oscillation signal is thus greater than that of the second oscillation signal. Therefore, in the examples disclosed herein, the position of the detection target is more precisely determined by down-converting the oscillation signal.

As set forth above, the actuator for a camera module according to the examples disclosed herein precisely detects the position of the lens barrel from the changes in the inductances of the sensing coils. Further, the actuator for a camera module does not use a separate hall sensor, such that a manufacturing cost of the actuator for a camera module is reduced and space efficiency of the actuator for a camera module is improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator, comprising:
an oscillating unit comprising two or more oscillation circuits each configured to output an oscillation signal comprising a frequency, which is changed in response to movement of a detection target disposed in the actuator;
a frequency down-converting unit configured to down-convert frequencies of two or more oscillation signals respectively output from the two or more oscillation circuits;
a computing unit configured to compute frequencies of tow or more down-converted oscillation signals; and
a determining unit configured to calculate a position of the detection target in response to the frequencies of the two or more down-converted oscillation signals.

2. The actuator of claim 1, wherein the frequency down-converting unit comprises two or more mixers each configured to down-convert the frequencies of the respective two or more oscillation signals.

3. The actuator of claim 2, wherein the two or more mixers are further configured to down-convert the frequencies of the two or more oscillation signals using a frequency of a reference signal.

4. The actuator of claim 3, wherein the two or more mixers are further configured to subtract the reference signal from the two or more oscillation signals, respectively.

5. The actuator of claim 3, wherein the two or more mixers are further configured to receive two or more reference signals different from each other, respectively, and
wherein frequencies of the two or more reference signals are determined in response to the frequencies of the two or more oscillation signals.

6. The actuator of claim 5, wherein frequency differences between the two or more reference signals and the two or more oscillation signals, respectively, are similar.

7. The actuator of claim 1, wherein each of the two or more oscillation circuits comprises a sensing coil disposed to face the detection target.

8. The actuator of claim 7, wherein the determining unit is further configured to detect a displacement of the detection target in a first direction parallel to a surface on which two or more sensing coils are disposed in response to a difference between the two or more down-converted oscillation signals.

9. The actuator of claim 7, wherein the determining unit is further configured to detect a displacement of the detection target in a second direction perpendicular to a surface on which two or more sensing coils are disposed in response to a sum of the two or more down-converted oscillation signals.

10. The actuator of claim 1, wherein frequency change ratios of the tow or more down-converted oscillation signals are greater than frequency change rations of the two or more down-converted oscillation signals, respectively.

11. A camera module comprising the actuator of claim 1.

12. A portable communications terminal comprising the camera module of claim 11.

13. An actuator, comprising:
an oscillating unit comprising two or more oscillation circuits respectively configured to output oscillation signals of which frequencies are changed in response to movement of a detection target disposed in the actuator;
a frequency down-converting unit configured to increase frequency change ratios of two or more oscillation signals respectively output from the two or more oscillation circuits;
a computing unit configured to compute frequencies of two or more down-converted oscillation signals output from the frequency down-converting unit; and
a determining unit configured to calculate a position of the detection target in response to the frequencies of the two or more down-converted oscillation signals.

14. The actuator of claim 13, wherein the frequency down-converting unit is further configured to down-convert frequencies of the two or more oscillation signals to generate the two or more down-converted oscillation signals comprising a frequency change ratio greater than a frequency change ratio of the two or more oscillation signals.

15. The actuator of claim 14, wherein the frequency down-converting unit comprises two or more mixers configured to respectively down-convert the frequencies of the two or more oscillation signals, using a reference signal.

16. The actuator of claim 15, wherein the two or more mixers are further configured to subtract the reference signal from the two or more oscillation signals, respectively.

17. The actuator of claim 15, wherein the two or more mixers are further configured to receive two or more reference signals different from each other, respectively, and
wherein frequencies of the two or more reference signals are determined in response to the frequencies of the two or more oscillation signals.

18. The actuator of claim 17, wherein frequency differences between the two or more reference signals and the two or more oscillation signals, respectively, are similar.

19. An actuator, comprising:
an oscillating unit comprising a first oscillation circuit configured to output a first oscillation signal comprising a first frequency that changes in response to a movement of a detection target, and a second oscillation circuit configured to output a second oscillation signal comprising a second frequency that changes in response to the movement of the detection target disposed in the actuator;
a frequency down-converting unit configured to down-convert the first and second frequencies;
a computing unit configured to compute frequencies of the down-converted first and second frequencies; and a determining unit configured to calculate a position of the detection target in response to the frequencies of the down-converted first and second frequencies.

20. The actuator of claim 19, wherein the oscillating unit comprises more than one second oscillation circuit.

* * * * *